Aug. 28, 1934. F. W. MOORE Re. 19,293

PILE FACED MATERIAL AND PROCESS OF MAKING THE SAME

Original Filed Jan. 2, 1924

INVENTOR:
Frederick W. Moore,
BY
Arthur B. Jenkins,
ATTORNEY.

Reissued Aug. 28, 1934

Re. 19,293

UNITED STATES PATENT OFFICE 19,293

PILE FACED MATERIAL AND PROCESS OF MAKING THE SAME

Frederick W. Moore, East Orange, N. J.

Original No. 1,739,322, dated December 10, 1929, Serial No. 683,935, January 2, 1924. Application for reissue December 9, 1931, Serial No. 579,970

16 Claims. (Cl. 154—2)

My invention relates to that class of materials used for coverings in upholstery, footwear, apparel and the like, and an object of my invention, among others, is the production of a finish on material of this sort and a process for making it, which material shall possess peculiar characteristics and which process shall enable the material to be produced in a particularly efficient and economical manner.

Material embodying my invention and a process for effecting the purpose of the invention, and in the making and use of which the objects herein set out, as well as others, may be attained, are illustrated in the accompanying drawing, in which—

Figure 1:
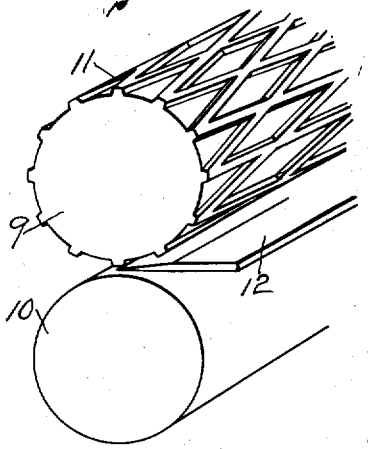
Figure 1 is a perspective view of a portion of a machine illustrating the method of making my improved material.

Leather, as is well known, is a particularly durable material for use as a covering in upholstery and the like, but it is objectionable on account of its hard and cold feeling. It is believed that if these objectionable features could be removed, leather would be employed to a much greater extent, not only in upholstery, but in various other lines, as in wearing apparel and in other articles requiring durability in wear.

The material illustrated and described herein and embodying my invention comprises a leather structure having the desirable features of soft feeling and of warmth desired. The invention also contemplates material other than leather to which a pile facing may be applied as a finish in the manner set out.

In the practice of my invention I take a piece of leather or other material 5 to one side of which I apply a coating of flexible adhesive binder 6, and to which I combine the pile side of a piece of plush 7 or other fabric faced with free erect fleece or fiber in forms to have their ends inserted into the adhesive binder to stand erect therein. In doing this the ends of the fibers 8 comprising the plush face or nap or pile are so set into the adhesive binder as to cause such face to be firmly secured and the structure thus formed is caused to pass between feed rolls 9 and 10, one of which rolls, as 9, may, if desired, have a patterned surface 11. This patterned surface may, however, be omitted when it is desired to produce a material having a smooth face, as shown on roll 16 in Figure 4. The material is moved forward between said rolls to the action of a rapidly moving knife 12 of band construction, which construction will be readily understood by those skilled in the art, and the rolls may be feed rolls or pin rolls.

It is of prime importance that the material shall be moved to the action of the knife with as little compression as possible, but sufficient to maintain it against the cutting action of the knife to feed uniformly at all points and this is accomplished by frictional grip upon the backing in either way produced, that is, whether with a smooth or a patterned face. Therefore, in order to provide for a uniform feed of the material to the knife the rolls, one or both, may be roughened, a pattern on one roll, when such roll is used, providing the necessary roughness for that roll. This frictional grip of the feed rolls upon the material may further be improved by providing a rest roll 13 of soft rubber for one of the feed rolls to impart a frictional pinch pressure to said feed rolls, and an auxiliary pull may be obtained by the action of pin rolls 14 and of fabric rolls 15 upon the latter of which the material may be wound as it is being divided, the action of said rolls being to pull the material toward the cutting knife. An even thickness of backing substance on both sides of the pile is important to uniform cutting with smooth faced rolls.

Figure 7:
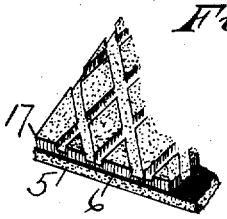
Figure 7 is a view showing the leather applied to the back face of the fabric side of a piece of plush.

While I have hereinbefore described leather as the material having a coating of flexible adhesive binder, the invention contemplates material other than leather, as cloth, felt or other material that may be substituted for the leather, and the backing materials may be arranged in various ways, and they may be applied by means of the adhesive to either or both sides of the plush structure, as for instance, leather may be applied as hereinbefore described to the face of the plush, and the latter being cut as hereinbefore set forth, another piece of leather may be applied by the adhesive to the free ends of the pile, and the latter being then again cut two pieces of leather each with a plush face will be produced, or the leather may be applied to the back surface of the fabric side 17 of the plush structure as shown in Figure 7 of the drawing, or the back surface of the fabric may be treated with cement and the cement back may be substituted for leather.

In securing the ends of the plush fibers to the backing of leather or other material, I employ a flexible adhesive binder that is sufficiently plastic to permit the material to be embossed, if desired, this binder having such characteristics as to permit the embossing and at the same time permanently retain the material in its embossed condition. This binder lies between the leather or other material and the pile or fleece, the roots of which are embedded in the adhesive so that the combined material, after it has been cut forms a finish, that may be completed by embossing, and which embossing will be absolutely permanent, and having the leather life, the plush pile, fleece or other face is like a suede and superior in finish to embossed plush, or fabrics which are without the leather body substance.

The plastic flexible body which I employ as a binder is composed of cotton nitrates with alcohol or other solvent and combined with vegetable oil, and I have found that the pile of the plush or other material, when anchored in said combining body will produce a material that may be embossed, and the finish will be more permanent than such embossing without the presence of said combining body.

The material is to quite an extent strengthened by the cut pile after it is cut, and being inlaid in its surface fiber this construction and the embossing increases this strength by intermingling portions of the cut fiber with the surface fiber of the leather and the binder combining said fiber to a union therewith and giving material strength to thin or split leather as well as a desirable finish.

Figure 4:
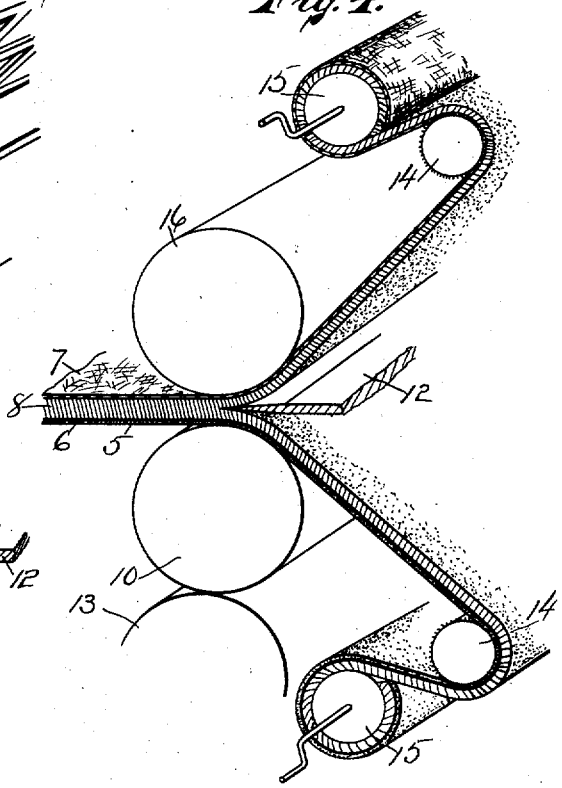
Figure 4 is a diagrammatic view illustrating the manner of producing material with a smooth face.
Figure 6:
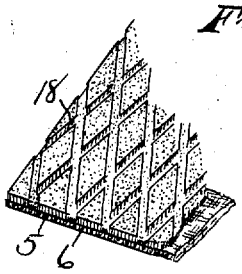
Figure 6 is a view showing a piece of fabric as produced by the patterned roll of Figure 1.

While I have illustrated and described herein a plush fabric forming one side only of the structure to be cut I contemplate that the plush fabric, when a patterned surface is to be produced, may comprise both sides of the structure previous to and during the cutting operation. When a roll with a patterned surface, as shown in Figure 1, is employed a fabric having a patterned surface 18 will be produced, as shown in Figure 6, whereas when a smooth roll, as 16, is used, as shown in Figure 4, a fabric with a smooth surface as shown in Figure 5 will be the result the pile being cut in a direction and so held as to cause the cut to skim along at or near the ends of the fibers and close to that surface of the strip that is to form the face thereof thereby imparting a suede or fur-like face to the same.

The fibers comprising the plush face of a piece of plush fabric are all inclined in a certain direction with respect to the backing or woven part of the fabric, and I have found that this feature may be taken into account in the splitting operation, as hereinbefore set forth. From extended experiments I have found that if the material comprising the two backings with the plush fibers between them be moved toward the knife so that the latter will operate against or in a direction opposite to the direction of slant of the fibers projecting from the piece which it is desired shall have the longest fibers composing the face, a distinct advantage will be gained. This is shown in Figure 2 of the drawing in which it will be seen that the knife 12 is operating against or in a direction opposite to the direction of slant of the fibers projecting from the cloth backing 7 which it is desired shall have the longest fibers, the leather backing 5 containing the shorter fibers, and in operating against the fibers as above described, I mean that the fibers shall be inclined toward the knife, as shown in Figures 2 and 4 of the drawing.

Figure 2:
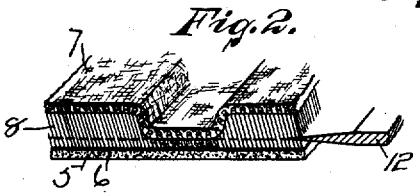
Figure 2 is a view, scale enlarged, in section through a piece of material illustrating the method of its construction.
Figure 3:
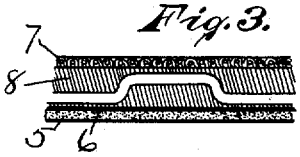
Figure 3 is an edge view of a piece of material.
Figure 5:
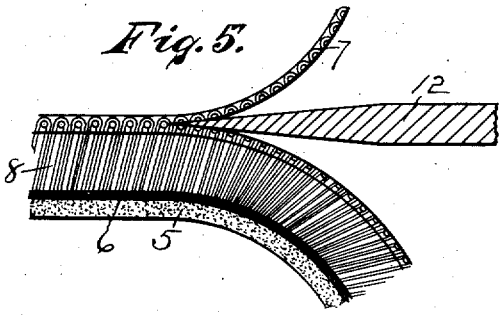
Figure 5 is a perspective view of a piece of material illustrating the manner of producing a smooth faced material in accordance with my invention, and having a maximum length of pile.

In other words, the knife is presented to the fibers in close proximity to either backing, the material being cut being presented to the knife so that the shorter fibers will slant away from the knife, as shown in Figures 2 and 5 of the drawing. This enables the knife to be presented to the fibers close to the adhesive on the leather or other backing, in fact, such knife in many instances being presented much closer to the adhesive than shown in Figure 2. A result of this is that the knife after striking the fibers creeps up or rather, the fibers are pressed down so that the knife actually cuts the fibers at a point farther away from the bottom backing than at the point at which the knife first makes contact with the fibers. The knife thus imparts a shearing cut to the fibers and the ends thereof are cut on a slant. The ends thus cut close to or near the face of the fabric or leather compose a uniform dense face upon the fabric having all of the ornate characteristics of fine velvet or suede, and the body substance composing the combining medium giving the "feel" and utility of leather.

While I have illustrated herein the cutting as actually taking place between the inner surfaces of the two backing members, it will be understood that my invention contemplates this cutting of the fibers at any point between the outer surfaces of the backing members, even to the extent of cutting through the woven fabric to which the pile is secured or looped, and as shown in Figure 5 of the drawing in which the cutting is shown as being through the loops of the pile.

I claim:

1. That process that consists in arranging the pile filling between more rigid backings in a manner to slant said pile to place one backing forward of the other and at the same time cut through the pile filling between said backings.

2. That process that consists in securing the free ends of the fibers comprising the soft face of a piece of material having a more rigid flexible backing to another backing composed of leather in a manner to cause said fibers to stand erect without distortion, then placing one backing in advance of the other to slant the fibers without material compression and at the same time cutting through the soft material between such backings.

3. That process that consists in securing the free ends of obliquely disposed fibers comprising the soft face of a piece of material with a more rigid flexible backing to another backing also of more rigid flexible material, then placing one of the backings in advance of the other to slant the fibers without material compression and at the same time cutting through said fibers closer to one than the other of said backings and in the direction of slant of said fibers from that backing close to which they are cut.

4. A new article of manufacture comprising a backing of flexible material having a surface of plush inlaid in a flexible cement binder in such manner as to cause the fibers to stand erect and without distortion, said fibers having obliquely cut free ends and the flexible cement binder located between the plush and the backing to secure the inner ends of the fibers comprising the plush pile to the surface of the flexible backing.

5. A new article of manufacture comprising a backing of leather having a coating of cement binder, and a plush pile having the ends of its fibers embedded in said binder and the oppositely obliquely cut ends disposed close to said backing and in the direction of slant of said fibers from said backing to impart a soft face to the leather.

6. A new article of manufacture comprising a backing of flexible material having a surface of plush fibers inlaid in a flexible cement binder and disposed obliquely and cut short in such a manner as to cause the fibers to stand erect and without distortion, said cut free ends being developed by the cutting to a density to cover the backing, said flexible cement binder being located between the plush and the backing to secure the inner ends of the fibers comprising the plush pile to the surface of the flexible backing and the cement imparting the cement consistency to the pile surface.

7. A new article of manufacture comprising a backing of sheet material having a surface of flush fibers embedded end-on in a flexible cement binder in such manner as to cause the fibers to stand substantially erect in a parallel contiguous relation, said fibers being obliquely cut close to the backing to impart a suede yet organized pile surface simulating that of suede leather while retaining the life and luster of fine velvet.

8. A new article of manufacture comprising a backing of sheet material having a surface of plush fibers embedded end-on in a flexible cement binder in such manner as to cause the fibers to stand substantially erect in a parallel contiguous relation, said fibers being disposed at a slight slant and cut close to the backing to impart a suede yet organized pile surface simulating that of suede leather while retaining the life and luster of fine velvet.

9. A new article of manufacture comprising a backing of sheet material having a surface of pile fibers adhered thereto end-on, said fibers protruding from the backing in parallel uniformly disposed contiguous relation and having the free ends of the pile fibers cut obliquely.

10. A fabric having a lustrous suede-like surface comprising a backing of sheet material, a surface layer of pile fibers adhered end-on thereto, said fibers protruding from the backing in parallel uniformly disposed contiguous relation and cut close to the face of the backing at an oblique angle.

11. The method of making pile fabrics which comprises coating sheet material with an adhesive binder, embedding in said adhesive binder the outer tips of the pile fibers of a woven fabric having pile looped therein, coalescing the pile to the backing through the intermediary of the adhesive material, and splitting the pile while it is disposed obliquely to the fabric to form two pile fabrics, one having pile looped in the woven backing and the other having pile adhered to the surface of the sheet material.

12. The method of making pile fabric which comprises utilizing the backing of a woven pile fabric as a matrix to position and hold the fibers of the pile, pressing the free tips of the pile against a sheet comprising adhesive material, coalescing the pile to said sheet in a manner to sustain the pile in substantially erect position, but at a slight slant to said sheet, splitting the pile closer to the said sheet than to the woven fabric, whereby two fabrics are formed, one having short-cut pile adhered to said sheet to produce a velvet-like material and the other having pile looped in the woven backing of a longer length and adapted for a repetition of the above indicated operations.

13. A single ply fabric comprising a backing of sheet material having a surface of pile fibers adhered thereto and protruding therefrom in substantially erect parallel uniformly disposed contiguous relation and at a slight slant angle, said fibers being sheared in such manner as to impart to the fabric a suede-like surface.

14. A single ply fabric comprising a backing of woven fabric and a flexible cement binder applied thereto and having short-cut pile looped evenly into the woven fabric and sustained at the loop portions by said binder in such manner as to cause the pile to stand substantially erect in parallel contiguous relation, the free ends of the pile being cut relatively close to the backing and at a slightly oblique angle thereto.

15. A single ply fabric comprising a backing of woven fabric and pile evenly looped therein and sustained in said fabric in a substantially erect parallel contiguous relation by a flexible adhesive binder, the free ends of said pile being disposed at a slight slant to, and cut parallel to, the surface of the woven fabric.

16. An article of manufacture comprising a woven fabric having a surface of pile fibers, said fibers being bonded to the fabric and having free ends protruding therefrom in substantially parallel uniformly disposed contiguous relation, the fiber ends being cut while the fibers are disposed at an oblique angle to the surface of the fabric.

FREDERICK W. MOORE.